Nov. 1, 1932.  E. B. MILLER ET AL  1,886,261
METHOD OF REFINING LIQUID HYDROCARBONS
Filed June 17, 1931
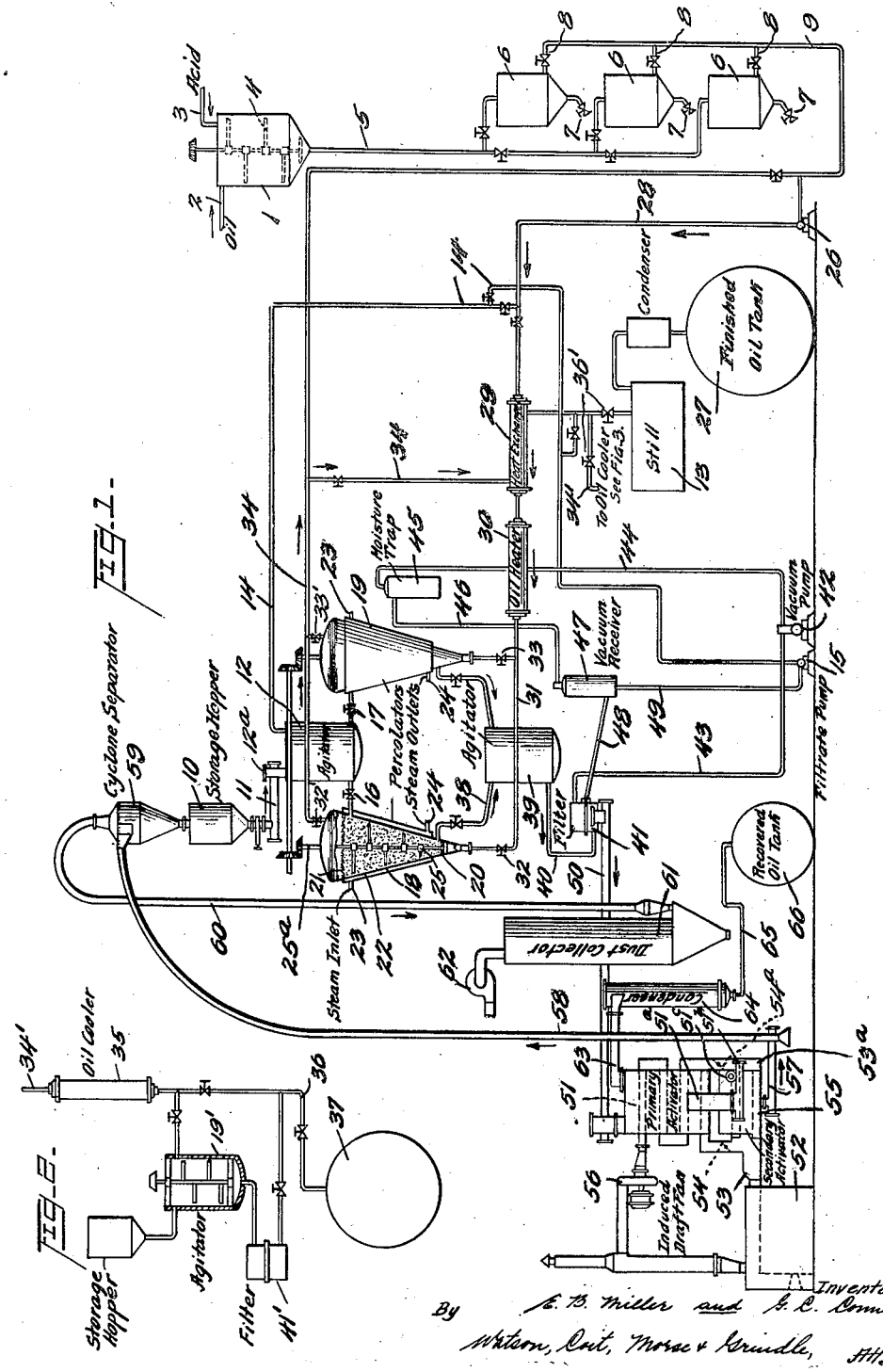

Patented Nov. 1, 1932

1,886,261

UNITED STATES PATENT OFFICE

ERNEST B. MILLER AND GERALD C. CONNOLLY, OF BALTIMORE, MARYLAND, ASSIGNORS TO THE SILICA GEL CORPORATION, OF BALTIMORE, MARYLAND, A CORPORATION OF MARYLAND

METHOD OF REFINING LIQUID HYDROCARBONS

Application filed June 17, 1931, Serial No. 545,099, and in Russia March 22, 1926.

The present invention relates to a method of refining liquid hydrocarbons, for example, petroleum oils such as gasoline, kerosene, and oils obtained by distillation of coal and the like, of the nature of benzol etc.

Liquid hydrocarbons are refined to meet certain trade specifications as to sulphur content, color, odor, acid content, sweetness, corrosion, and gums.

Some liquid hydrocarbons can be refined to the required specifications with a relatively small quantity of porous adsorbent like silica gel. Others require a large quantity of the porous adsorbent, say one part of adsorbent to one part of the hydrocarbon, in order to meet the specifications. Still other hydrocarbons, if treated with an adsorbent like silica gel alone, cannot be made to satisfy all the specifications.

The principal object of the present invention is to provide a method of refining liquid hydrocarbons so that they will comply with any and all of the usual specifications and accomplishing this result with a high ratio of the hydrocarbon to the porous adsorbent employed.

Some liquid hydrocarbons, before refining, comply with one or more of the usual specifications. The treatment according to the present invention may vary in accordance with what specifications are to be met. For the purpose of the present case, the treatments may be divided into four classes as follows:

1. To remove elemental sulphur only.
2. To meet the doctor test only (make sweet).
3. To meet all the specifications except the gum test.
4. To remove gum forming constituents from highly unsaturated hydrocarbons and meet all the other specifications.

The treatment of the first class mentioned above, that is to say, where it is desired to remove the elemental sulphur only, consists in treating the liquid hydrocarbon with a solid, porous adsorbent like silica gel at an elevated temperature and with the hydrocarbon in the liquid phase. The ratio of the hydrocarbon to the adsorbent may run from 25 to 100 parts or more of the hydrocarbon to one part of the adsorbent, the exact ratio depending upon the amount and character of the sulphur.

For the second and third classes mentioned above, that is, for the doctor test or to meet any of the other specifications except the one for gums, the process consists in treating the hydrocarbon with a solid, porous absorbent like silica gel impregnated with one or more metallic oxides at an elevated temperature and with the hydrocarbon in the liquid phase. The ratio of the liquid hydrocarbon to the adsorbent may be the same as for the first class.

For the fourth class, that is, highly unsaturated hydrocarbons containing gum forming constituents, the process may consist in treating the hydrocarbon with a solid, porous adsorbent, like silica gel, impregnated with a polymerizing agent, such as a small quantity of strong acid, and then distilling the treated liquid. Preferably, however, the small quantity of acid is added to the unrefined liquid instead of to the adsorbent, and the sludge removed prior to the adsorbent treatment. The treatment with the adsorbent is effected at elevated temperature and with the hydrocarbon in the liquid phase. Whether the agent is added to the adsorbent, or the agent and adsorbent treatment are effected successively, in some cases for best results, the adsorbent should also be impregnated with one or more metallic oxides. The ratio of the hydrocarbon to the solid porous adsorbent may be about the same as for the other classes.

Other objects and features of novelty will be apparent from the description taken in connection with the drawing, in which:

Figure 1 is a diagrammatic elevation with parts in section of an apparatus for carrying out the present invention; and Figure 2 is a diagrammatic illustration of apparatus used in conjunction with the apparatus of Figure 1 when it is desired to give the partially refined hydrocarbon a second treatment with adsorbent, at normal temperature.

The apparatus illustrated in the drawing will be described as employed for refining liquid hydrocarbons containing gum forming constituents so that the refined product will comply with all the required specifications.

Referring to the drawing, the oil to be refined and a polymerizing agent are supplied to a treatment tank 1, the oil through the pipe 2 and the polymerizing agent, for example acid, through the pipe 3, these ingredients being thoroughly agitated by means of the rotating agitator 4.

The polymerizing agent may be an acid, an organic material such as di-methyl sulphate, or salts such as anhydrous aluminum chloride. Usually the most economical agent is sulphuric acid. This is employed in a quantity varying from .1% to .5% of the oil, where strong acid, that is, 80% to 100% strength, is used.

The agent, such as acid, is employed in a relatively small quantity and reacts with a portion only of the unsaturated constituents of the oil to form reaction products including gums which are in solution in the hydrocarbon. Later in the process, the hydrocarbon is treated with an adsorbent, and it is thought that some or all of these gums, in solution in the liquid, are adsorbed by the adsorbent and/or deposited thereon, and act catalytically to polymerize the balance of the gum forming constituents in the hydrocarbon.

The treated oil is discharged from the tank 1 through through pipe 5 connected to a series of settling tanks 6 arranged in parallel. In addition to polymerizing gum forming constituents, the polymerizing agent also throws out a small quantity of sludge, and this settles out in the settling tanks 6 and may be drained through the valved outlets 7 in the bottom thereof.

After the sludge has been permitted to settle to the bottom of the tank, the hydrocarbon is discharged through pipe 8 into pipe 9 leading to pump 26. It will be understood that the treated oil discharged through the pipe 9 contains the acid hydrocarbon reaction products, such as the polymerized gums, in solution. Suitable valves are provided in each of the pipes so that the acid treatment tank can be put in communication with any one of the settling tanks and any one of the settling tanks can be put in communication with the pump 26 leading to the adsorbent treatment apparatus hereinafter described.

The series of settling tanks 6 permits a substantially continuous flow of partially purified oil. Obviously, any number of settling tanks may be employed.

The adsorbent treatment apparatus includes a storage hopper 10 for the adsorbent material and a suitable means such as a worm conveyor 11 connected so as to discharge into an agitator 12.

If it is desired to impregnate the adsorbent with the polymerizing agent rather than to add it directly to the oil, the agent, such as sulphuric acid, may be introduced as a spray at 12$^a$ in an amount up to about 5% of the weight of the adsorbent, its strength being from 80% to 100% where sulphuric acid is employed. It is to be understood, however, that it is preferred to introduce the acid directly into the oil in the treatment tank 1.

In addition to the adsorbent, the agitator is supplied with sufficient hydrocarbon liquid from pipe 14 leading from the filtrate pump 15, so that the mixture will flow from the agitator through one of the valves 16 or 17 to the percolator 18 or 19. About three parts of the liquid to one part of the adsorbent is sufficient for this purpose.

Each of the percolators is provided with a bottom screen 20 and a top screen 21, and a steam jacket 22 having a steam inlet 23 and a steam outlet 24, so that the contents of the percolator are maintained at an elevated temperature. The mixture of adsorbent and liquid just described fills the space between screens 20 and 21, and this space is provided with suitable agitators 25 carried by a shaft 25$^a$, which may be rotated by any suitable means.

After the percolator has been charged with the adsorbent, the liquid to be refined is passed through the same. For this purpose a pump 26 withdraws the liquid to be treated from one of the settling tanks 6, and through pipe 28 conducts it to a heat exchanger 29, then through a heater 30 in which the liquid is heated, and then by a pipe 31 to the bottom of the percolator. Valves 32 and 33 control the supply of liquid to the percolators. It will be understood that when one of these valves is opened, the other is closed so that one percolator only is used at a time. The liquid to be refined then passes up through one of the percolators where it is brought into contact with the adsorbent and refined.

Valves 32' and 33' are interposed between the percolators 18 and 19 and the discharge pipe 34. These valves may serve either to totally disconnect the respective percolators from the pipe 34, or to cut down the rate of discharge of liquid into pipe 34, so that, if necessary, the pressure in the percolators may be raised, so as to maintain the hydrocarbon as a liquid at the temperature of the treatment. The liquid discharged from the percolators passes through pipe 34 to the heat exchanger 29 where some of the heat of the partially refined liquid is transferred to the incoming untreated liquid. From the heat exchanger, the partially refined liquid passes to the distillation apparatus 13 where the hydrocarbon is distilled from the polymerized gums, the completely purified oil being received in the tank 27.

Furthermore, by means of valves 36', the flow of liquid through the percolators, effected by the pump 26, may be so retarded or relieved as to maintain the oil in the percolators as a liquid during the treatment. In practice it may be preferable to control the pressure in the percolators by valves 36′ rather than by valves 32′ and 33′, as previously suggested. Valves 36′ may be operated automatically by the pressure in the percolators, whereas the valves 32′ and 33′ would best be used only to cut any percolator in or out of the circuit as desired.

In any instance. it is desirable to keep the pressure in the percolators just high enough to maintain practically all the oil in the liquid state.

The acid treated oil is supplied to either percolator until about 25 to 100 or more parts of oil to one part of the adsorbent flow through the percolator, the amount of oil that can be treated in one batch of the adsorbent depending upon the amount and nature of the impurities. From the foregoing it is seen that the adsorbent is employed in a quantity insufficient to adsorb any substantial amount of the reaction products, i. e. the polymerized gums in solution in the hydrocarbon, although it will adsorb the liquid, elemental surphur as explained hereinafter.

After the above stated amount of liquid has been treated in say percolator 18, valves 32 and 32′ are closed, and valves 33 and 33′ of percolator 19 are opened so that the oil is now passed through and treated in the percolator 19. While the treatment is going on in the second percolator, the adsorbent in the first percolator is discharged through pipe 38 into an agitator 39, and from this agitator by means of pipe 40 to a filter 41 which may be of the vacuum type, the vacuum pump being indicated at 42, and its discharge pipe at 43. Preferably, this pipe discharges into the casing of the filter so as to return to the filter any vapors. The suction of the vacuum pump is connected by pipe 44 to a moisture trap 45 which in turn, by means of pipe 46, is connected to the vacuum receiver 47. Into this receiver, the liquid filtrate from the filter flows through pipe 48. The filtrate accumulating in receiver 47 flows through pipe 49 to filtrate pump 15 previously mentioned.

The adsorbent separated by the filter is conveyed, as by a worm conveyor 50, to a primary activator 51 wherein it is subjected to the heat from the hot gases from furnace 52. The products of combustion from the furnace pass into flue 53 wherein there is a damper 54 which controls the proportion of these gases that pass directly to the primary activator 51. The gases that pass through the secondary activator flow through flue 53ª to the primary activator, the amount of gases being controlled by a damper 54ª in flue 53ª. The adsorbent passes from the primary activator to the secondary activator through conduit 51ª and worm conveyors 51ᵇ and 51ᶜ.

The secondary activator is maintained at a higher temperature than the primary activator. These activators preferably are of the type having a series of hearths superposed on each other, there being radial arms sweeping over each hearth to agitate and feed the adsorbent passing therethrough, and being regenerated. The flow of gases in the flues is induced by the draft fan 56.

From the secondary activator 55, the regenerated adsorbent is conveyed as by worm conveyor 57, to a pipe 58 connected to a cyclone separator 59 wherein the adsorbent is separated from the air and settles into the storage hopper 10. The air separated by the cyclone separator passes through pipe 60 to a dust collector 61 wherein any particles of adsorbent that may be carried along in the air are recovered. The flow of the mixture of air and adsorbent in the pipe 58, separator 59, pipe 60, and dust collector 61 is brought about by fan 62 at the air discharge end of the dust collector.

Any liquid hydrocarbon liberated from the adsorbent in the activators may pass through pipe 63 to the condenser 64 where it is condensed and conducted by a pipe 65 to a recovered oil tank 66.

As stated, the hydrocarbon being treated may be heated before delivery to the percolator.

While being treated with the adsorbent it is maintained at an elevated temperature of from 150° to 500° F., preferably at about 300° to 325° F., at which temperature any elemental sulphur present will be in the liquid phase, so that the adsorbent may separate it from the oil by adsorption in its pores. Although it is preferred to maintain the temperatures at about 300° to 325° F., satisfactory results may be obtained by having the temperature at about 250° to 300° F., or even 240° F. The liquid is maintained at this elevated temperature by means of the steam in the steam jacket 18.

Instead of separating the refined hydrocarbon from the dissolved reaction products by distillation, the same result may be effected by passing the liquid with the dissolved reaction products therein through a porous absorbent material like silica gel at normal temperature and pressure.

For this purpose, the product from the percolators 18 and 19 instead of being led to the distillation apparatus 13 is conducted through pipe 34′ and cooler 35 to an agitator 19′. This agitator may be of any suitable type, constructed so as to effect an intimate contact between the liquid hydrocarbon and an adsorbent such as silica gel, at normal temperature and pressure. After this treatment, the hydrocarbon is separated from the adsorbent by means such as a filter press 41′ or a Dorr thickener, or the like, and then discharged into the finished oil tank 37.

If desired, the adsorbent, such as silica gel, employed in the agitator 19' may be impregnated with one or more of the subsequently mentioned metallic oxides.

The preferred porous adsorbent material adapted for use in the practice of the present invention is silica gel. This material is a hard, solid substance having ultramicroscopic pores in such number that it will adsorb vapors and gases at very low partial pressures. This silica gel will adsorb water vapor to such an extent as to contain at least 10% of its own weight of water when in equilibrium with water vapor at 30° C. and a partial pressure of 22 mm. of mercury. The better grades will adsorb as high as 40% of water under these conditions.

When highly unsaturated hydrocarbons containing gum forming constituents such as cracked gasoline and benzol are treated, it is often advantageous to employ an adsorbent having associated therewith one or more metallic oxides.

For impregnating the adsorbent material, a metallic oxide is employed which has the property of readily combining with sulphur to form a compound which may be broken down by heat, such as the oxides of copper, iron, lead, zinc, antimony, and silver, or any combination thereof. The preferred adsorbent for carrying out the present invention is silica gel, of the nature hereinbefore described, impregnated with copper oxide or a combination of iron oxide and copper oxide. The maximum amount of the oxide employed is about one per cent of the weight of the adsorbent for each oxide. That is to say, where one oxide is employed, a maximum of about one per cent of this oxide is used. Where two oxides are used, each is present in the amount of a maximum of about one per cent.

To illustrate a method of impregnating the adsorbent material with an oxide, the process of impregnating silica gel with copper oxide will be described, although it will be apparent that such method may be used in connection with other metals than copper and with other adsorbent materials. An aqueous solution of almost any easily decomposable soluble copper salt, preferably copper nitrate of any desired strength is thoroughly mixed with the gel by direct mixing or by a spray, or in any other suitable manner. Copper nitrate readily breaks down under heat at a temperature of 200° to 300° F. to form the green insoluble basic nitrate. The basic nitrate, in turn, breaks down to form insoluble copper oxide with the liberation of water vapor and oxides of nitrogen. This formation of copper oxide is complete at 1000° F. which is about the highest temperature employed in the activation of the adsorbent. If the gel is to be impregnated with an oxide of one or more of the other metals mentioned, the procedure is the same, the salt that decomposes at the lowest temperature being selected.

In some instances, where the hydrocarbon has been treated with acid, it is desirable to wash with water or a dilute caustic solution, either before or after the distillation step or its equivalent.

The acid may be added to the oil periodically instead of continually, the periods occurring at least once for each batch of adsorbent employed in the percolators. Thus if the quantity of oil that one batch of adsorbent will refine is 100%, the acid may be added to the first 20%, thus forming gums some of which deposit on the adsorbent, and act catalytically, as explained above, to polymerize the remaining gum forming constituents in the said 20% and also the gum forming constituents in the remaining 80% of oil. The acid may be sulphuric of any suitable concentration, for instance, 62° Bé., the quantity varying from 0.1% to 0.5% of the oil, as previously stated.

Certain oils, particularly those containing suspended or dissolved water, are more effectively purified if the acid or other agent be added in two or more steps, the first addition serving to pre-dry and the later addition or additions to react with the impurities, including the gums. The acid may be sulphuric of any desirable strength, for instance, 80% to 100%, the quantity varying within the limits above disclosed.

As stated, the preferred adsorbent material is silica gel, but bauxite, fullers earth, bentonite, carbon, adsorbent clays, and the like, may be used, although they do not withstand the heat of activation as well as the gel and for this reason cannot be used over and over and are not adapted to commercial use.

Instead of silica gel, other hard, porous gels might be used, such as tungstic, aluminic, stannic, etc.

The apparatus has been described as employed for refining hydrocarbons having gum forming constituents, to meet all the trade specifications. Where there are no gum forming constituents in the liquid to be treated, the apparatus is used in the same way except that no acid is added to the adsorbent or unrefined liquid, and the final distillation or adsorbent step is omitted.

Where the object of the refining is to remove elemental sulphur, an unimpregnated adsorbent may be used, that is to say, the adsorbent, silica gel for example, is used without being impregnated with oxides or acid.

It is to be understood that the process constituting the present invention may be practiced in any suitable apparatus and that the particular apparatus illustrated and described is not in any way to limit the scope of the appended claims.

This application is a continuation in part of applications Serial Number 65,466, filed October 28, 1925, Serial Number 276,163, filed May 8, 1928, and Serial Number 381,256, filed July 26, 1929.

Having thus described the invention, what is claimed as new and desired to be secured by Letters Patent is:

1. The method of refining liquid hydrocarbons containing unsaturates including gum forming constituents comprising, treating the hydrocarbon with strong sulphuric acid of 80 to 100% strength in a quantity of 0.1 to 0.5% of the weight of the hydrocarbon in a series of steps, settling out and removing the resulting sludge, contacting said treated hydrocarbon while containing in solution acid-hydrocarbon reaction products resulting from said acid treatment, with solid, porous, adsorbent material in a quantity of less than 4% of the hydrocarbon at an elevated temperature of from 150° to 500° F. with the hydrocarbon in the liquid phase, said material having copper and iron oxides associated therewith in a quantity of about 1% each of the weight of the material, separating the hydrocarbon from the adsorbent and distilling to separate the hydrocarbon from the reaction products and other impurities contained therein.

2. The method of refining liquid hydrocarbons containing unsaturates including gum forming constituents comprising, treating the hydrocarbon with strong sulphuric acid of 80 to 100% strength in a quantity of 0.1 to 0.5% of the weight of the hydrocarbon in a series of steps, settling out and removing the resulting sludge, contacting said treated hydrocarbon while containing in solution acid-hydrocarbon reaction products resulting from said acid treatment, with solid, porous, adsorbent material in a quantity less than 4% of the hydrocarbon at an elevated temperature of from 150° to 500° F. with the hydrocarbon in the liquid phase, separating the hydrocarbon from the adsorbent and distilling to separate the hydrocarbon from the reaction products and other impurities contained therein.

3. The method of refining liquid hydrocarbons containing unsaturates including gum forming constituents comprising, treating the hydrocarbon with strong sulphuric acid of 80 to 100% strength in a quantity of 0.1 to 0.5% of the weight of the hydrocarbon, settling out and removing the resulting sludge, contacting said treated hydrocarbon while containing in solution acid-hydrocarbon reaction products resulting from said acid treatment, with silica gel in a quantity less than 4% of the hydrocarbon at an elevated temperature of from 150° to 500° F. with the hydrocarbon in the liquid phase, separating the hydrocarbon from the adsorbent and distilling to separate the hydrocarbon from the reaction products and other impurities contained therein.

4. The method of refining liquid hydrocarbons such as cracked hydrocarbons containing gum forming constituents comprising, treating the hydrocarbon with strong sulphuric acid in a quantity sufficient to polymerize a portion only of gum forming constituents, settling out and removing the resulting sludge, contacting said treated hydrocarbon while containing in solution acid-hydrocarbon reaction products resulting from said acid treatment, with solid, porous, adsorbent material in a quantity less than 4% of the hydrocarbon at an elevated temperature of from 150° to 500° F., with the hydrocarbon in the liquid phase, separating the hydrocarbon from the adsorbent and distilling to separate the hydrocarbon from the reaction products and other impurities contained therein.

5. The method of refining liquid hydrocarbons containing unsaturates including gum forming constituents comprising, treating the hydrocarbon with strong sulphuric acid in a quantity sufficient to polymerize a portion only of gum forming constituents, contacting said treated hydrocarbon while containing in solution acid-hydrocarbon reaction products resulting from said acid treatment, with solid, porous, adsorbent material, in a quantity less than 4% of the hydrocarbon at an elevated temperature of from 150° to 500° F., with the hydrocarbon in the liquid phase, separating the hydrocarbon from the adsorbent and distilling to separate the hydrocarbon from the reaction products and other impurities contained therein.

6. The method of refining liquid hydrocarbons containing unsaturates including gum forming constituents comprising, treating the hydrocarbon with strong sulphuric acid of 80 to 100% strength in a quantity sufficient to polymerize a portion only of gum forming constituents, contacting said treated hydrocarbon while containing in solution acid-hydrocarbon reaction products resulting from said acid treatment, with solid, porous, adsorbent material in a quantity less than 4% of the hydrocarbon at an elevated temperature with the hydrocarbon in the liquid phase, separating the hydrocarbon from the adsorbent and distilling to separate the hydrocarbon from the reaction products and other impurities contained therein.

7. The method of refining liquid hydrocarbons containing unsaturates including gum forming constituents comprising, treating the hydrocarbon with strong sulphuric acid of 80 to 100% strength in a quantity sufficient to polymerize a portion only of gum forming constituents, contacting said treated hydrocarbon while containing in solution acid-hydrocarbon reaction products resulting from said acid treatment, with solid, porous, adsorbent material in a quantity less than 4% of the hydrocarbon at an elevated temperature with the hydrocarbon in the liquid phase, and distilling to separate the hydrocarbon from the reaction products and other impurities contained therein.

8. The method of refining liquid hydrocarbons containing unsaturates including gum forming constituents comprising, treating the hydrocarbon with strong sulphuric acid of 80 to 100% strength in a quantity sufficient to polymerize a portion only of gum forming constituents, contacting said treated hydrocarbon while containing in solution acid-hydrocarbon products resulting from said acid treatment, with a porous adsorbent at an elevated temperature with the hydrocarbon in the liquid phase, and distilling to separate the hydrocarbon from the reaction products and other impurities contained therein.

9. The method of refining liquid hydrocarbons containing gum forming constituents comprising, treating the hydrocarbon with strong sulphuric acid of 80 to 100% strength in a quantity sufficient to polymerize a portion only of gum forming constituents, contacting said treated hydrocarbon while containing in solution acid-hydrocarbon reaction products resulting from said acid treatment, with a porous adsorbent in a quantity less than 4% of the hydrocarbon at an elevated temperature with the hydrocarbon in the liquid phase, and distilling to separate the hydrocarbon from the reaction products and other impurities contained therein.

10. The method of refining liquid hydrocarbons such as cracked hydrocarbons containing gum forming constituents comprising, treating the hydrocarbon with strong sulphuric acid of 80 to 100% strength in a quantity of 0.1 to 0.5% of the weight of the hydrocarbon, contacting said treated hydrocarbon while containing in solution acid-hydrocarbon products resulting from said acid treatment, with silica gel in a quantity less than 4% of the hydrocarbon at an elevated temperature under pressure sufficient to maintain the hydrocarbon in the liquid phase, and distilling to separate the hydrocarbon from the reaction products and other impurities contained therein.

11. The method of refining liquid hydrocarbons such as cracked hydrocarbons containing gum forming constituents comprising, treating the hydrocarbon with strong sulphuric acid, removing the resulting sludge, contacting said treated hydrocarbon containing gums and gum-forming constituents with porous adsorbent having associated therewith at least one metallic oxide capable of readily combining with sulphur at an elevated temperature in the liquid phase, and separating the hydrocarbon from the reaction products and other impurities contained therein.

12. The method of refining liquid hydrocarbons such as cracked hydrocarbons containing gum forming constituents comprising, treating the hydrocarbon with strong sulphuric acid, removing the resulting sludge, contacting said treated hydrocarbon containing gums and gum-forming constituents with a porous adsorbent at an elevated temperature in the liquid phase, separating the hydrocarbon from the reaction products and other impurities contained therein.

13. The method of refining liquid hydrocarbons such as cracked hydrocarbons, comprising treating said hydrocarbon with a suitable reagent in such quantity as will polymerize a portion only of gum forming constituents in said hydrocarbon, contacting said treated hydrocarbon with a hard, porous gel at an elevated temperature of at least 150° F. under pressure sufficient to maintain the hydrocarbon in the liquid phase, and separating the hydrocarbon from the reaction products and other impurities contained therein.

14. The method of refining light hydrocarbons, comprising treating said hydrocarbon with a suitable reagent in such quantity as will polymerize a portion only of gum forming constituents in said hydrocarbon, contacting said treated hydrocarbon with silica gel at an elevated temperature of at least 150° F. in the liquid phase and separating the hydrocarbon from the reaction products and other impurities contained therein.

15. The method of refining liquid hydrocarbons comprising treating the hydrocarbon with a suitable reagent in an amount sufficient to polymerize a portion only of gum forming constituents, treating the hydrocarbon containing polymerized reaction products in solution with a porous adsorbent material having associated therewith at least one metallic oxide capable of readily combining with sulphur said latter treatment accomplishing polymerization of remaining gum-forming constituents and then separating the hydrocarbon from the impurities and resulting reaction products.

16. The method according to claim 15 wherein the sludge formed by the reaction of the polymerizing agent upon the hydrocarbon is removed prior to the adsorbent treatment.

17. The method according to claim 15 wherein the treatment with the adsorbent is effected at an elevated temperature of at least 150° F. and with the hydrocarbon in the liquid phase.

18. The method according to claim 15 wherein the polymerizing agent is sulphuric acid.

19. The method according to claim 15 wherein the separation of the hydrocarbon from the impurities and reaction products is effected by distillation.

20. The method according to claim 15 wherein two oxides are employed consisting of oxides of copper and iron.

21. The method according to claim 15 wherein the adsorbent is a hard, porous gel.

22. The method according to claim 15 wherein the treatment with adsorbent material is effected at a temperature of from 150° to 500° F.

23. The method of refining light hydrocarbons comprising treating the hydrocarbon with from 0.1% to 0.5% of strong sulphuric acid, removing the resulting sludge, treating the hydrocarbon with a hard, porous gel in an amount less than about 4% of the hydrocarbon said latter treatment accomplishing polymerization of remaining gum-forming constituents and distilling the hydrocarbon from the reaction products.

24. The method of refining light hydrocarbons comprising treating the hydrocarbon with from 0.1% to 0.5% of strong sulphuric acid, contacting the treated hydrocarbon while containing in solution acid-hydrocarbon reaction products resulting from said acid treatment, with a hard, porous gel in a quantity insufficient to adsorb the reaction products, said latter treatment accomplishing polymerization of remaining gum-forming constituents and then separating the hydrocarbon from the reaction products.

25. The method according to claim 24 wherein the separation from the reaction products is effected by distillation.

26. The method according to claim 24 wherein the treatment with the gel is effected at an elevated temperature and with the hydrocarbon in the liquid phase.

27. The process of refining hydrocarbons containing unsaturated constituents comprising treating the hydrocarbon with a suitable reagent in an amount sufficient to polymerize a portion only of gum forming constituents in said hydrocarbon, then contacting said hydrocarbon with a porous, adsorbent material in an insufficient quantity to adsorb any substantial amount of the polymerized gums in said hydrocarbon, said latter treatment accomplishing polymerization of remaining gum forming constituents and finally separating the purified hydrocarbon from the impurities.

28. The process in accordance with claim 27 wherein said absorbent treatment is effected at an elevated temperature and with said hydrocarbon in the liquid phase.

29. The method according to claim 27 wherein the treatment of the hydrocarbon with the initial polymerizing agent is effected in stages.

30. The method of refining light hydrocarbons comprising treating the hydrocarbon with a small quantity of acid, then treating the hydrocarbon containing in solution acid-hydrocarbon reaction products resulting from said acid treatment, with a porous, adsorbent material, said latter treatment accomplishing polymerization of remaining gum-forming constituents and then separating the purified hydrocarbon from the impurities and resulting reaction products.

31. The process in accordance with claim 30 wherein said light hydrocarbons are of the nature of cracked gasoline, kerosene and benzol.

32. The process in accordance with claim 30 wherein said acid is strong sulphuric acid in a quantity of from 0.1% to 0.5% by weight of the hydrocarbon.

33. The process in accordance with claim 30 wherein said adsorbent is a hard, porous gel.

34. The process in accordance with claim 30 wherein the adsorbent is used in a proportion of one part to more than 25 parts of hydrocarbon.

35. The process in accordance with claim 30 wherein the treatment of the hydrocarbon with the adsorbent is effected at an elevated temperature and with the hydrocarbon in the liquid phase.

36. The process in accordance with claim 30 wherein the treatment of the hydrocarbon with the adsorbent is effected by passing the hydrocarbon through a bed of the adsorbent.

37. The process in accordance with claim 30 wherein the hydrocarbon after treatment with the adsorbent is separated from impurities therein by distillation.

38. The process in accordance with claim 30 wherein the hydrocarbon after treatment with the adsorbent is separated from impurities therein by treatment with a porous adsorbent material at normal temperature and pressure.

39. The process in accordance with claim 30 wherein sludge formed by said acid treatment is removed prior to the adsorbent treatment.

40. The process in accordance with claim 30 wherein the adsorbent is removed from the hydrocarbon prior to the separation of the reaction products and other impurities.

41. The process in accordance with claim 30 wherein said adsorbent has associated therewith at least one metallic oxide capable of readily combining with sulphur.

42. The process of refining liquid hydrocarbons of the nature of cracked gasoline, kerosene, benzol, and the like, comprising treating the hydrocarbon with acid in a quantity sufficient to polymerize a portion only of gum-forming constituents contained in said hydrocarbon, contacting the treated hydrocarbon while containing in solution acid-hydrocarbon reaction products resulting from said acid treatment, with a porous, adsorbent material at an elevated temperature, whereby additional reaction products form in said hydrocarbon, and separating the hydrocarbon from the reaction products.

43. The process of refining light hydrocarbons comprising, contacting an acidulated light hydrocarbon containing gums and gum-forming constituents with a porous adsorbent material in a quantity insufficient to remove any substantial amount of reaction products in solution, said treatment accomplishing polymerization of remaining gum-forming constituents and separating the hydrocarbon from the impurities remaining therein.

44. The process in accordance with claim 43 wherein the contact of the hydrocarbon and adsorbent is effected at an elevated temperature and with the hydrocarbon in the liquid phase.

45. The process in accordance with claim 43 wherein the contact of hydrocarbon and adsorbent is effected at a temperature sufficiently high to melt any elemental sulphur in said hydrocarbon.

46. The method of refining liquid hydrocarbons which comprises treating the hydrocarbon containing element sulphur with a hard, porous gel material having pores of such size that it will adsorb water vapor to such an extent as to contain not less than about 10% of its own weight of water when in equilibrium with water vapor at 30° C. and a partial pressure of substantially 22 mm. of mercury, the treatment being effected at a temperature of about 250-300° F. and with the hydrocarbon liquid.

47. The method according to claim 46 wherein the gel material is silica gel.

48. The method according to claim 46 wherein the ratio of liquid treated to the material is more than 25 to 1.

49. The method of refining liquid hydrocarbons which comprises treating the liquid with a hard porous silica gel imprenated so as to include copper oxide, which oxide is present in a maximum amount of about 1% of the weight of the dry gel, the treatment being effected at a temperature above 240° F. but below the cracking temperature of the hydrocarbon, and under sufficient pressure to maintain the hydrocarbon in the liquid phase.

30. The method of refining liquid hydrocarbons which comprises treating the liquid with a hard, porous, silica gel having at least one metallic oxide associated therewith at an elevated temperature and under pressure sufficient to keep the hydrocarbon in the liquid phase, said oxide having an affinity for sulphur and its sulphur compound being reconvertible into the oxide by heating under oxidizing conditions.

51. The method of refining liquid hydrocarbons which comprises treating the liquid with a hard, porous silica gel impregnated so as to include a metallic oxide, the treatment being effected at an elevated temperature, said oxide having an affinity for sulphur and its sulphur compound being reconvertible into the oxide by heating under oxidizing conditions.

52. The method of refining liquid hydrocarbons which comprises treating the liquid with silica gel having at least one metallic oxide associated therewith at an elevated temperature and under pressure sufficient to keep the hydrocarbon in the liquid phase, said oxide having an affinity for sulphur and its sulphur compound being reconvertible into the oxide by heating under oxidizing conditions, one said metallic oxide being copper oxide.

In testimony whereof we hereunto affix our signatures.

ERNEST B. MILLER.
GERALD C. CONNOLLY.